E. F. STRONG.
STOCK DIPPING TANK.
APPLICATION FILED JULY 1, 1916.
1,207,815.
Patented Dec. 12, 1916.
2 SHEETS—SHEET 2.
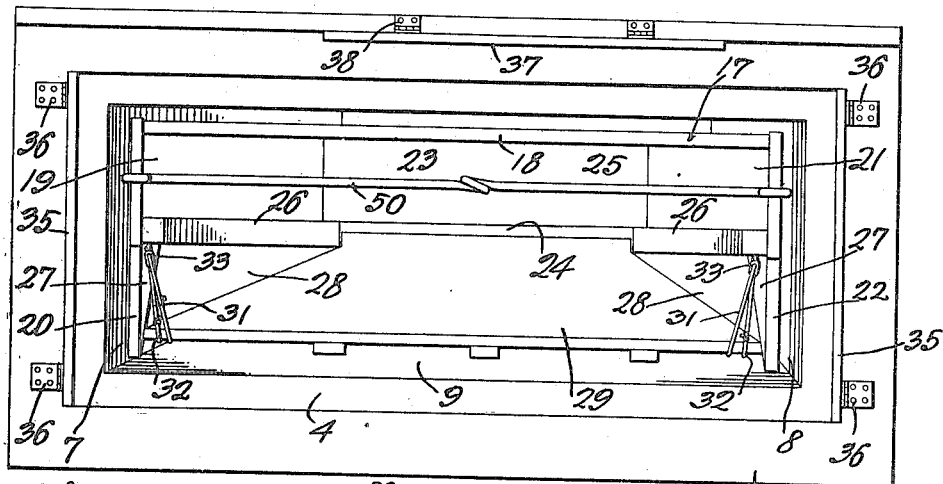
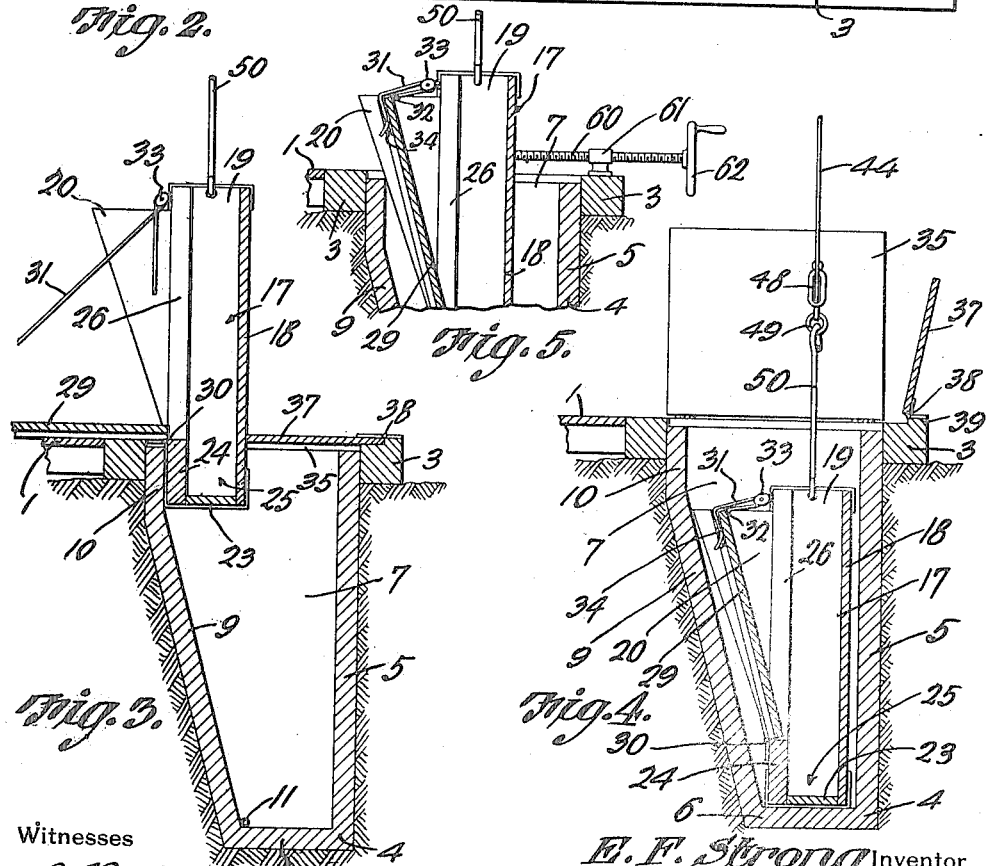
Witnesses
E. F. Strong Inventor
by Attorneys

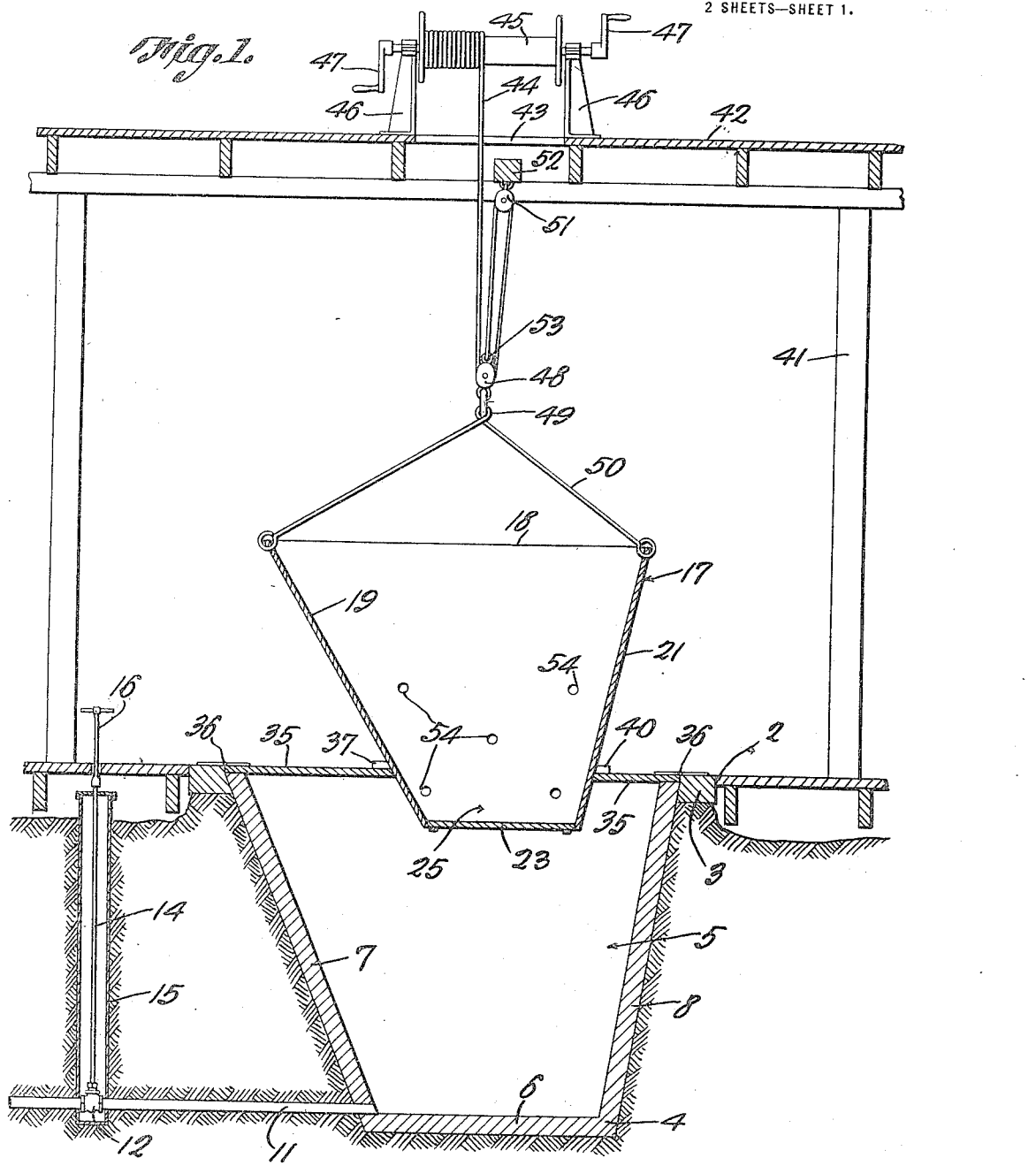

UNITED STATES PATENT OFFICE.

EDWIN F. STRONG, OF INDIAN VALLEY, VIRGINIA.

STOCK-DIPPING TANK.

1,207,815.

Specification of Letters Patent.  Patented Dec. 12, 1916.

Application filed July 1, 1916. Serial No. 107,116.

*To all whom it may concern:*

Be it known that I, EDWIN F. STRONG, a citizen of the United States, residing at Indian Valley, in the county of Floyd and State of Virginia, have invented a new and useful Stock-Dipping Tank, of which the following is a specification.

The device forming the subject matter of this application is adapted to be employed for dipping stock into an antiseptic solution for the purpose of freeing the stock from parasites.

One object of the present invention is so to construct the tank which contains the dipping solution, that a comparatively small amount of dipping solution will be necessary.

Another object of the invention is to improve the cage in which the animal is lowered into the tank, so that the animal to be dipped may be put into the cage readily and be readily removed therefrom.

Another object of the invention is to provide means whereby the cage will be prevented from swinging when the animal is being placed in the cage.

Another object of the invention is to provide novel means for closing the top of the dipping tank when the cage is elevated and when an animal is being put in the cage.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in vertical section, a dipping mechanism including the present invention, parts appearing in elevation; Fig. 2 is a top plan of the tank, the view showing the dipping cage lowered into the tank; Fig. 3 is a cross section of the tank and the dipping cage, the latter being raised up and in the condition it will assume when the animal is being placed in the cage; Fig. 4 is a section similar to Fig. 3 but showing the cage lowered into the dipping tank; and Fig. 5 is a fragmental sectional view showing a slight modification in the invention.

The numeral 1 denotes a platform having an opening 2 surrounded by a frame 3. Located below the platform 1 around the opening 2 is a dipping tank 4 which may be made of any material. The dipping tank 4 includes a vertical back 5 and a horizontal bottom 6. The dipping tank 4 includes end walls 7 and 8. The end walls 7 and 8 slope toward each other as they extend downwardly and, as Fig. 3 will show, the walls 7 and 8 taper toward their lower ends. The front of the tank is shown at 9 and is inclined inwardly as it extends downwardly. The front 9 terminates at its upper edge in an extension 10 which is parallel to vertical back 5.

From the foregoing, it will be seen that the dipping tank 4 tapers toward its lower end, and because the dipping tank tapers, a comparatively small amount of solution is required. The dipping solution may be drained out of the tank 4 by a pipe 11 which may carry a valve 12 controlled in any suitable way, as by means of a rod 14 located in a casing 15 and rotated by means of a key 16 extended above the platform 1.

The invention includes a cage 17 in which the animal is held during the dipping operation. The cage 17 includes a vertical back 18 parallel with the back 5 of the tank 4, an end wall 19 having a triangular extension 20, and an end wall 21 having a triangular extension 22, the walls 19 and 21 tapering toward their lower ends. The cage 17 includes a bottom 23 and a low front 24 which is parallel to the back 18 as Fig. 3 will show, the elements last above mentioned forming at the lower end of the cage 17, a trough 25 of restricted extent, in which the animal is adapted to stand during the dipping operation. The cage 17 tapers toward its lower end, as will be obvious from what has been stated hereinbefore. Brace bars 26 are secured to the end walls 19 and 21. Filler blocks 27 abut against the outer edges of the brace bars 26 and against the extensions 20 and 22 of the end walls. The inner faces of the filler blocks 27 are beveled off as shown at 28. A door 29 is united by means of hinges 30 with the upper edge of the front 24. The side edges of the door 29 converge as they extend downwardly, to correspond with the slope of the walls 19 and 21. The door 29 may be swung inwardly until it lies between the brace bars 26, or it may be swung outwardly to any desired extent, as indicated in Fig. 3. Because the filler blocks 27 are beveled as shown at 28, there will be no gap along the upright edges of the door 29 when the door is swung inwardly or outwardly. Ropes 31 are secured to the door 29 as shown at 32 and are passed through pulley blocks 33 on the brace bars 26. The outer face of the door 29 may carry cleats 34 with which the ropes 31 may be connected detachably. By means of the ropes 31, the door 29 may be swung inwardly or outwardly, and be held in adjusted positions. The constituent walls of the cage 17 are provided with holes 54 permitting the dipping solution to enter the cage when the cage is lowered into the tank 4.

End doors 35 are united by hinges 36 with the frame 3. These doors are adapted to coöperate with the walls 19 and 21 of the dipping cage 17 in a manner which will be pointed out hereinafter. A rear door 37 is united by means of hinges 38 with the frame 3. The door 37 coöperates with the vertical back 18 of the cage 17. As shown at 39 in Fig. 4, the hinges 38 of the door 37 are located at a higher elevation than the hinges 36 of the doors 35, so that the door 37 can close down on top of the doors 35. As shown at 40 in Fig. 1, the rear door 37 is long enough so that it can overlap the doors 35 when all of the doors are closed.

Any suitable means may be provided for raising and lowering the cage 17. If desired, the platform 1 may support a frame 41 which, in its turn, supports a floor 42. There is a hole 43 in the floor 42 through which extends a rope 44, the upper end of which is connected to a windlass 45 mounted to turn in standards 46 carried by the floor 42. The windlass 45 may be turned by means of cranks 47 or otherwise. The rope 44 is passed through a pulley block 48 held in an eye 49 formed in a bail 50 connected at its ends with the walls 19 and 21 of the cage 17. The rope 44 after passing through the pulley block 48 is passed through a pulley block 51 carried by one of the timbers 52 of the floor 42. The end of the rope 44 is connected as shown at 53 with the pulley block 48. It is to be understood, however, that any suitable means other than that shown may be provided for raising and lowering the cage 17.

The operation of the device is as follows:—The cage 17 is raised into the positions Figs. 1 and 3 by means of the rope 44 and the windlass 45. The end doors 35 are swung down into the positions of Fig. 1 and engage the walls 19 and 21 of the cage 17. The rear door 37 is swung down into a closed position, as shown best in Fig. 3, and engages the vertical back 18 of the cage. The cage thus is held so that it cannot swing about. The ropes 31 are slacked away and the door 29 of the cage 17 is permitted to swing down into a horizontal position on top of the platform 1, as shown in Fig. 3. The animal to be dipped is driven into the cage 17 and stands on the bottom 23, within the trough 25. The door 29 of the cage is now pulled up by means of the ropes 31, and the ropes are secured by cleats 34 as shown in Fig. 5. Owing to the slant which the walls 19 and 21 of the cage have, the animal will be confined in such a way that it cannot move about readily. The hinged door 29 permits animals to be confined closely, even though such animals may be broader or narrower, across the hips and through the belly. If a comparatively small animal such as a sheep is to be dipped, then the door 29 is disposed in a substantially vertical position. After the animal has been confined in the cage 17, the doors 35 and 37 are raised and the cage 17 is lowered into the tank 4, the solution in the tank flowing into the cage through the openings 54 effecting an immersion of the animal in the cage. After the animal has been dipped for a sufficient period of time, the cage 17 is raised by means of the rope 44 and the windlass 45. As the cage is raised, the doors 37 and 35 are swung over into inclined positions and as the cage arrives at the raised position of Fig. 1, the doors will close about the cage, thus holding the cage against swinging. The door 29 of the cage may then be lowered, as shown in Fig. 3, permitting the animal to be taken out of the cage. While the cage 17 is being raised and lowered, the doors 35 and 37 in inclined positions bear against the cage and tend to steady the movement of the same.

In Fig. 5 of the drawings, a slight modification of the invention is shown. In this form of the invention, the rear door 37 is dispensed with, the cage 17 being forced over by means of a screw 60 threaded into a bearing 61 on the frame 3 and turned by means of a hand wheel 62 or otherwise.

Noting Fig. 3 of the drawings and comparing the same with Fig. 5, it will be observed that when the cage 17 is lowered, the outer edges of the extensions 20 and 22 coöperate with the platform along one edge of the opening 2, to move the cage laterally so that the back 18 of the cage lies close to the back 5 of the tank 4, when the cage is lowered as shown in Fig. 4.

Having thus described the invention, what is claimed is:—

1. A stock dipping device including a tank; a downwardly tapered cage coöperating with the tank; means for raising and lowering the cage; and movable means under the control of an operator and permanently connected with the tank and engaging the cage to steady the cage against lateral movement when the cage is being raised and lowered, and when the smaller lower end of the cage is adjacent the top of the tank.

2. A stock dipping device including a tank; a cage coöperating with the tank, the cage including a downwardly slanting wall; means for raising and lowering the cage; a door for the tank and coöperating with the slanting wall of the cage to limit the lateral movement of the cage as the cage is raised and as the smaller, lower end of the cage approaches the top of the tank; and means for mounting the door for vertical swinging movement.

3. A stock dipping device including a tank; a cage movable with respect to the tank, the cage having slanting ends and being tapered toward its lower end and embodying a vertical side; a door coöperating with the vertical side of the cage when the cage is raised and when the smaller end of the cage approaches the top of the tank; end doors coöperating with the slanting ends of the cage; and means for mounting all of the doors for vertical swinging movement.

4. A stock dipping device including a platform having an opening; a tank located below the opening; a downwardly tapered cage coöperating with the tank, the cage having an open side and including end walls having outwardly projecting inclined extensions coöperating with the platform at one edge of the opening to move the cage laterally as the cage is lowered; a downwardly swinging door for the open side of the cage and adapted to move upwardly between the extensions to a closed position; and a vertically swinging door hinged to the platform at the other edge of the opening and coöperating with the cage to hold the cage against lateral movement when the cage is raised.

In testimony that I claim the foregoing as my own, I have hereto affixed my signature in the presence of two witnesses.

EDWIN F. STRONG.

Witnesses:
J. H. CARDUFF,
J. L. SOWERS.

Copies of this patent may be obtained for five cents each, by addressing the "Commissioner of Patents, Washington, D. C."